(12) United States Patent
Foley et al.

(10) Patent No.: US 12,311,714 B1
(45) Date of Patent: May 27, 2025

(54) TENSION LEAF WITH AUXILIARY SPRING

(71) Applicant: Ford Global Technologies, LLC, Dearborn, MI (US)

(72) Inventors: Shane Edward Foley, Milford, MI (US); Steven Scott Allen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/679,542

(22) Filed: May 31, 2024

(51) Int. Cl.
*B60G 11/04* (2006.01)

(52) U.S. Cl.
CPC .......... *B60G 11/04* (2013.01); *B60G 2202/10* (2013.01); *B60G 2204/121* (2013.01); *B60G 2206/428* (2013.01); *B60G 2800/162* (2013.01)

(58) Field of Classification Search
CPC ........ B60G 11/04; B60G 11/10; B60G 11/02; B60G 2204/121
See application file for complete search history.

(56) References Cited

U.S. PATENT DOCUMENTS

| | | | | |
|---|---|---|---|---|
| 1,229,109 A * | 6/1917 | McIntyre | ............... | B60G 11/04 267/41 |
| 1,362,037 A * | 12/1920 | Peterson | .............. | B60G 17/023 267/45 |
| 1,632,993 A * | 6/1927 | Brush | .................. | B60G 11/107 267/43 |
| 3,312,459 A * | 4/1967 | Pence | ...................... | B60G 7/04 267/45 |
| 5,209,518 A | 5/1993 | Heckenliable et al. | | |
| 5,992,831 A * | 11/1999 | Hellwig | ..................... | F16F 1/22 267/48 |
| 6,158,723 A * | 12/2000 | Hellwig | ................. | B60G 11/04 267/52 |
| 6,352,245 B1 * | 3/2002 | Norden | .................. | B60G 11/04 267/52 |
| 8,317,211 B1 * | 11/2012 | Ryshavy | ............... | B60G 9/003 280/124.175 |

(Continued)

FOREIGN PATENT DOCUMENTS

| | | | | |
|---|---|---|---|---|
| CA | 2517105 A1 * | 2/2007 | ............. | B60G 11/04 |
| CN | 209409739 U | 9/2019 | | |

(Continued)

*Primary Examiner* — Nicole T Verley
(74) *Attorney, Agent, or Firm* — Burr & Forman LLP; Lorne Forsythe

(57) ABSTRACT

A tension leaf assembly includes an S-shaped leaf member, an auxiliary spring, and a coupling assembly. The leaf member includes a first end, a second end, and a longitudinal center disposed between the first and second ends, and also includes a suspension portion extending from the first end past the longitudinal center and a bend portion extending from the suspension portion to the second end. The auxiliary spring is operably coupled to the leaf member at the longitudinal center and extends in a direction parallel to the leaf member. The auxiliary spring includes first and second free ends facing away from the suspension and bend portions, respectively. The coupling assembly operably couples the leaf member to the auxiliary spring at the longitudinal center, and includes a positioner disposed between the auxiliary spring and the leaf member and a holding bracket to engage a wheel axle of the vehicle.

20 Claims, 4 Drawing Sheets

(56) References Cited

U.S. PATENT DOCUMENTS

| | | | | |
|---|---|---|---|---|
| 10,059,163 B2* | 8/2018 | Asbeck | ................... | F16F 3/10 |
| 2007/0045915 A1* | 3/2007 | Svendsen | ................... | F16F 1/26 |
| | | | | 267/37.3 |
| 2007/0102854 A1* | 5/2007 | Hellwig | ................. | B60G 11/04 |
| | | | | 267/27 |
| 2012/0193887 A1* | 8/2012 | Muck | ................... | B60G 11/04 |
| | | | | 280/124.163 |
| 2022/0333660 A1* | 10/2022 | Berlingieri | ............ | B60G 11/113 |

FOREIGN PATENT DOCUMENTS

| | | | | | |
|---|---|---|---|---|---|
| CN | 111497540 | A | * | 8/2020 | ............ B60G 11/02 |
| DE | 102014202581 | A1 | * | 8/2015 | ............ B60G 11/02 |
| EP | 1564039 | A1 | * | 8/2005 | ............ B60G 11/04 |
| EP | 4261056 | A1 | | 10/2023 | |
| JP | 2000103212 | A | | 4/2004 | |
| JP | 2005096494 | A | * | 4/2005 | ............ B60G 11/04 |
| JP | 2014012528 | A | * | 1/2014 | ............ B60G 11/02 |
| WO | 9907593 | A1 | | 2/1999 | |
| WO | WO-2015121345 | A1 | * | 8/2015 | ............ B60G 11/02 |
| WO | 2016194302 | A1 | | 12/2016 | |
| WO | WO-2021053395 | A3 | * | 5/2021 | ............ B60G 11/04 |

\* cited by examiner

TENSION LEAF WITH AUXILIARY SPRING

TECHNICAL FIELD

Example embodiments generally relate to vehicle suspension and, more particularly, relate to a leaf spring suspension system augmented with an auxiliary spring.

BACKGROUND

Vehicles commonly employ suspension systems to enhance the ride experience for passengers. The components and geometries used for suspension systems designs can vary to some degree. One common form of vehicle suspension is the leaf spring. A leaf spring is a spring that is often formed from one or more thin plates (often of metal) that are arc-shaped. The ends of the arc-shaped plate(s) are attached to the chassis of the vehicle, and the center portion of the arc-shaped plate(s) is attached to the axle of the vehicle. This allows the spring to flex vertically to respond to irregularities encountered on the driving surface.

Although leaf springs represent a robust suspension option, particularly useful for heavy duty cargo carrying vehicles (e.g., trucks and large sport utility vehicles (SUVs)), the leaf spring assembly itself (i.e., the collection of metal plates combining to form the leaf spring) often also becomes quite heavy.

BRIEF SUMMARY OF SOME EXAMPLES

In accordance with an example embodiment, a tension leaf assembly for a vehicle suspension system may be provided. The tension leaf assembly may include an S-shaped leaf member, an auxiliary spring, and a coupling assembly. The leaf member includes a first end, a second end, and a longitudinal center disposed between the first and second ends. The leaf member may include a suspension portion extending from the first end past the longitudinal center and a bend portion extending from the suspension portion to the second end. The auxiliary spring is operably coupled to the leaf member and extending longitudinally in a direction substantially parallel to a direction of extension of the leaf member. The auxiliary spring includes a first free end facing away from the suspension portion and a second free end facing away from the bend portion. The coupling assembly operably couples the leaf member to the auxiliary spring at or proximate to the longitudinal center. The coupling assembly includes a positioner disposed between the auxiliary spring and the leaf member and a holding bracket to engage a wheel axle of the vehicle.

In another example embodiment, a vehicle suspension system may be provided. The suspension system may include a wheel assembly of the vehicle, a body of the vehicle, and a tension leaf assembly operably coupling the wheel assembly and the body to dampen forces on the body of the vehicle responsive to compression and rebound events experienced at the wheel assembly. The tension leaf assembly may include an S-shaped leaf member, an auxiliary spring, and a coupling assembly. The leaf member includes a first end, a second end, and a longitudinal center disposed between the first and second ends. The leaf member may include a suspension portion extending from the first end past the longitudinal center and a bend portion extending from the suspension portion to the second end. The auxiliary spring is operably coupled to the leaf member and extending longitudinally in a direction substantially parallel to a direction of extension of the leaf member. The auxiliary spring includes a first free end facing away from the suspension portion and a second free end facing away from the bend portion. The coupling assembly operably couples the leaf member to the auxiliary spring at or proximate to the longitudinal center. The coupling assembly includes a positioner disposed between the auxiliary spring and the leaf member and a holding bracket to engage a wheel axle of the vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
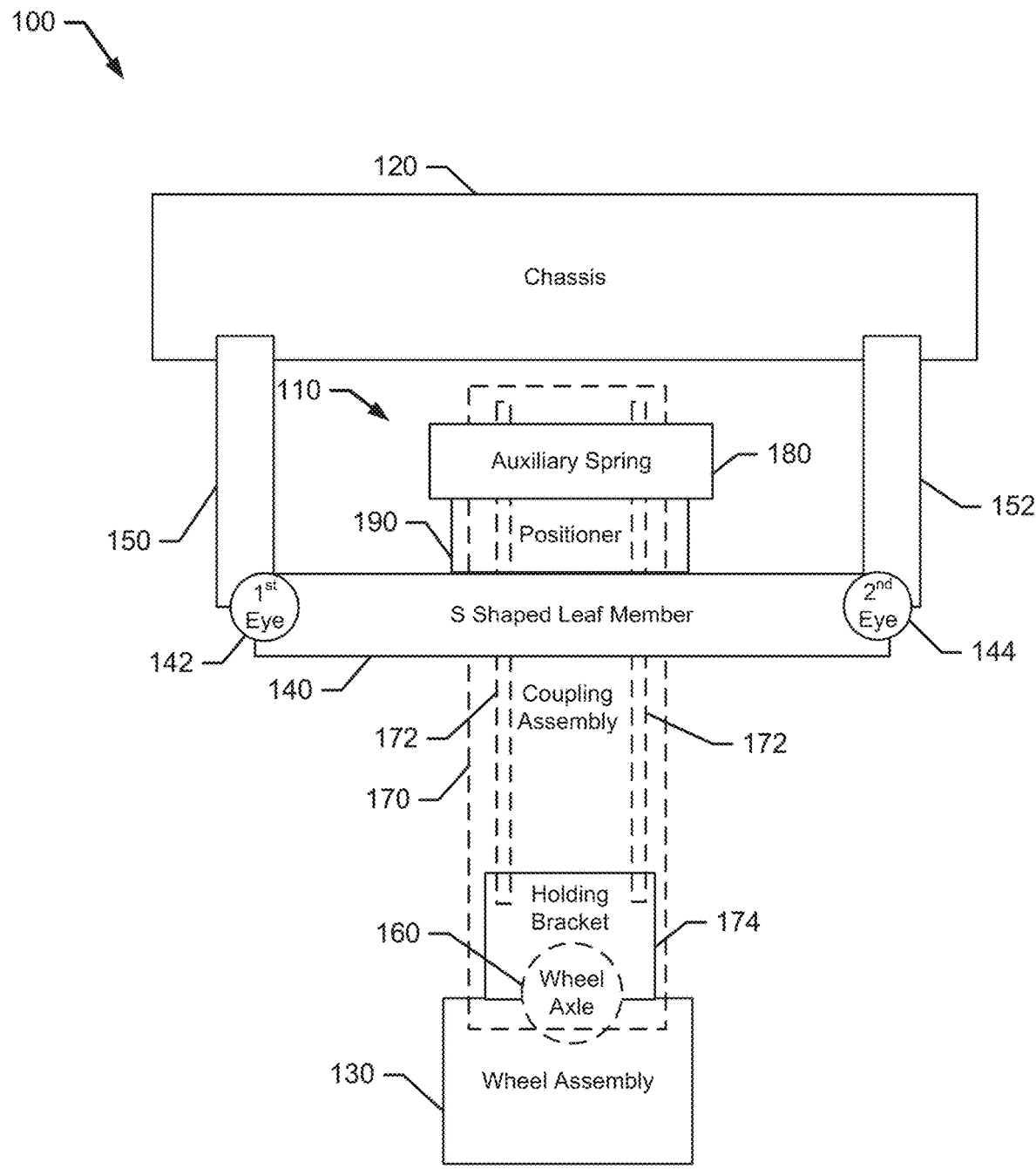
FIG. 1 illustrates a block diagram of a vehicle suspension system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may provide an enhanced leaf spring assembly that can replace a heavy leaf spring pack, including multiple leaves, while still providing robust capability for handling heavy loads. Moreover, example embodiments may have a progressive wheel rate and provide large weight savings. In particular, example embodiments may include the provision of a tension leaf design with an S-shape, thereby replacing the multi-leaf pack and shackle structure so familiar for leaf spring suspensions with a lighter architecture. This allows removal of the shackle or slipper pad interface. However, the S-shaped tension leaf design of example embodiments further employs an auxiliary spring to provide a tension leaf assembly that is light, but still quite robust.

FIG. 1 illustrates a block diagram of a vehicle suspension system 100 employing a tension leaf with auxiliary spring assembly 110. The tension leaf with auxiliary spring assembly 110 may be used to dampen jounce and rebound forces that may be initiated between a body or chassis of the vehicle (either of which will generally be represented by chassis 120 going forward) and a wheel assembly 130

(which may include each individual wheel and other suspension system components that support the corresponding wheels). In some cases, the chassis 120 may include or be defined by a body or frame, and the frame may additionally be formed of one or more casted subframes.

Bumps or obstacles in a terrain over which a vehicle is being operated may cause the wheel and wheel assembly 130 to articulate varying amounts depending on how the vehicle is driven and the size of the obstacle in the terrain. Thus, the vehicle suspension system 100 may reach full compression at certain points depending on the articulation distance the wheel assembly 130 may be required to travel. In other words, the wheel assembly 130 may be forced towards the chassis 120 until a point at which the vehicle suspension system 100 may be at full compression and the distance between the chassis 120 and wheel assembly 130 may be at a minimum. In the other direction, the wheel assembly 130 may move away from the chassis 120 until a point at which the suspension system may be at full rebound and the distance between the wheel assembly 130 and chassis 120 is at a minimum. In both cases, the tension leaf with auxiliary spring assembly 110 may provide tension to inhibit or resist compression and rebound in order to provide a smoother ride for occupants of the vehicle.

As noted above, the tension leaf with auxiliary spring assembly 110 operably couples the chassis 120 to the wheel assembly 130. The tension leaf with auxiliary spring assembly 110 may include an S-shaped leaf member 140 having a first eye 142 and a second eye 144 at respective opposing ends thereof. The first and second eyes 142 and 144 may operably couple the opposing ends of the leaf member 140 to the chassis 120 either directly or indirectly. In some cases, the first eye 142 may be operably coupled to a first portion of the chassis 120 via a first mounting assembly 150, and the second eye 144 may be operably coupled to the second portion of the chassis 120 via a second mounting assembly 152. The first mounting assembly 150 may be displaced from the second mounting assembly 152 longitudinally and therefore perpendicular to a direction of extension of a wheel axle 160 of the vehicle. In an example embodiment, the first and second mounting assemblies 150 may be brackets or other components attached to and extending away from the first and second portions of the chassis 120. However, the first and second mounting assemblies 150 may alternatively be formed in or provided at the first and second portions of the chassis 120 without extension away from the chassis 120 in some cases.

In an example embodiment, the leaf member 140 may be operably coupled to the wheel axle 160 via a coupling assembly 170. The coupling assembly 170 may include or otherwise be embodied as a U bolt assembly. As such, for example, the coupling assembly 170 may include U-shaped bolts 172 that extend around the leaf member 140 at one end thereof (e.g., at or near an apex of the U-shaped bolts 172) and that are operably coupled to a holding bracket 174 that engages the wheel axle 160 at distal ends of the U-shaped bolts 172. The U bolt assembly 170 may also operably couple an auxiliary spring 180 to a top portion of the leaf member 140 (i.e., a portion of the leaf member 140 that faces the chassis 120). However, in an example embodiment, a positioner 190 may be provided between the auxiliary spring 180 and the top portion of the leaf member 140.

Figure 2:
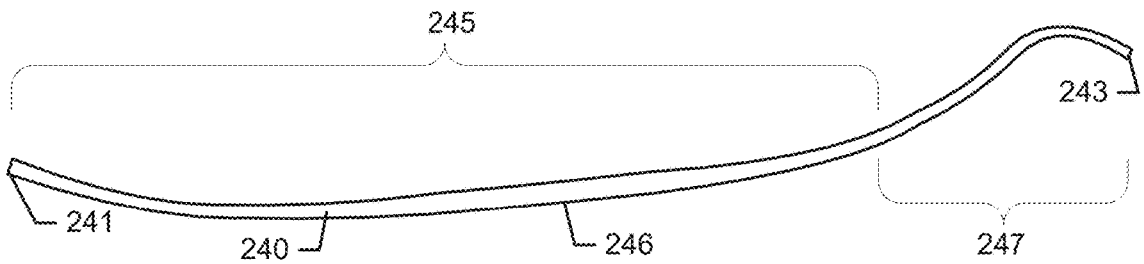
FIG. 2 illustrates a side view of a leaf member of a tension leaf assembly in isolation in accordance with an example embodiment.
Figure 3:
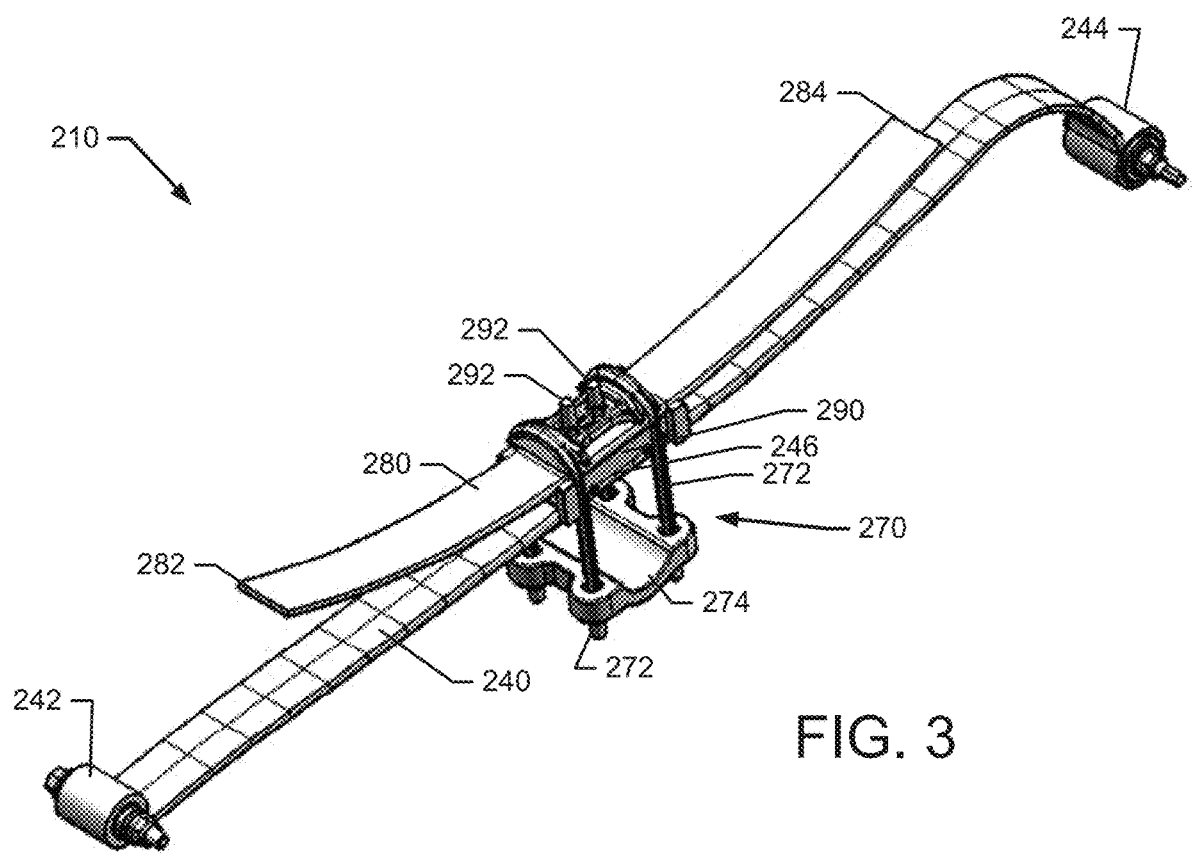
FIG. 3 illustrates a perspective view of the tension leaf assembly in accordance with an example embodiment.

The various components of FIG. 1 may be embodied in physical form in a number of different ways. FIGS. 2-6 illustrate examples of one such physical form. In this regard, FIG. 2 illustrates a side view of leaf member 240 shown in isolation and in a free state (i.e., unloaded and removed from the vehicle suspension system 100). Thereafter in FIGS. 3-6 illustrate various views of a tension leaf with auxiliary spring assembly 210 that further includes an auxiliary spring 280 functionally combined with the leaf member 240 via a coupling assembly 270. The tension leaf with auxiliary spring assembly 210 of FIGS. 3-6 is also shown in resting loaded state, which means that although the tension leaf with auxiliary spring assembly 210 is shown isolated from other suspension system components, it is actually shown in the state in which it would be installed in the vehicle and under the normal loaded state of the vehicle when not moving or encountering any forces tending to displace the wheel axle.

Turning first to FIG. 2, the leaf member 240 may include a first end 241 to which a first eye 242 (see FIG. 3) may be attached, and a second end 243 to which a second eye 244 (see FIG. 3) may be attached. The leaf member 240 includes a suspension portion 245 that extends from the first end 241 past a longitudinal center 246 of the leaf member 240. The leaf member 240 also includes a bend portion 247 that extends from an end of the suspension portion 245 that is opposite the first end 241 to the second end 243.

The leaf member 240 may be a relatively flat and elongated strip of metal or composite material (e.g., fiber-reinforced plastic or fiber-reinforced glass) that is formed to include pre-formed bends along its longitudinal length to provide desirable characteristics with respect to bearing a load when the first and second ends 241 and 243 are attached to a vehicle chassis (e.g., chassis 120) and the longitudinal center 246 is attached to a movable component (e.g., the wheel assembly 130). A thickness of the leaf member 240 may vary across different applications so long as its width is several times longer than its thickness, and its length is many times longer than its width. Nevertheless, and merely by way of example and not limitation, some examples of the leaf member 240 may have a thickness of between about 5 mm to about 50 mm and a width of between about three to ten times the thickness.

As can be seen in FIG. 2, although both the suspension portion 245 and the bend portion 247 are curved in the free state (i.e., unloaded and uninstalled state), the curvature of the suspension portion 245 is less than the curvature of the bend portion 247. However, particularly when comparing FIGS. 2 and 4, it can be seen that when the leaf member 240 is in a loaded rest state (i.e., disposed on a vehicle that is not moving or under any additional load), the natural weight of the vehicle tends to flatten out the suspension portion 245 whereas the bend portion 247 remains noticeably bent still at a significant amount. This bending phenomenon, and particularly the placement of the bend portion 247 rearward of the suspension portion 245, is helpful with respect to making the front end of the vehicle suspension stiffer than the rear end. When the vehicle encounters an obstacle, and the wheel axle 160 is forced to move, such movement necessarily involves bending of the leaf member 240. The S shape of the leaf member 240, and particularly the increased radius of the leaf member 240 at the bend portion 247 allows the front end to be stiffer and cause more of the movement, and bending, to be taken up by the bend portion 247 for a smoother overall ride experience.

Additionally, a length of the bend portion 247 is significantly less than a length of the suspension portion. In some embodiments, the bend portion 247 may be between about ⅓ and ⅕ as long as the suspension portion 245. The transition between the bend portion 247 and the suspension portion 245 may be defined by the point at which the upwardly curved part of the leaf member 240 meets the downwardly curved part of the leaf member 240.

The structure of the leaf member 240 is useful itself in providing a relatively robust suspension capability without the usage of multiple similarly shaped leaves in a pack defining a leaf spring. The significant weight reduction achieved by this structure reduces the unsprung weight of the vehicle and also generally reduces part count, enhances efficiency, and simplifies assembly of the vehicle. However, for more heavy duty vehicles (e.g., vehicles having (rear gross axle weight rating) RGAWR above 6340 lbs) it may be desirable to provide additional backup suspension capability. For such vehicles, the auxiliary spring 280 may be added via the coupling assembly 270 shown in FIGS. 3-6.

In an example embodiment, the coupling assembly 270 may include one or more U-shaped bolts 272 that extend around the auxiliary spring 280 and draw the auxiliary spring 280 toward, and the retain auxiliary spring 280 in position relative to, the leaf member 240. Thus, for example, the one or more U-shaped bolts 272 (two of which are shown in FIGS. 3-6) may engage the auxiliary spring 280 at an apex of the U-shaped bolts 272 and engage a holding bracket 274 of the coupling assembly at distal ends of the one or more U-shaped bolts 272. The distal ends of the one or more U-shaped bolts 272 may be threaded and a nut may be applied to secure the distal ends of the one or more U-shaped bolts 272 to the holding bracket 274.

In an example embodiment, a positioner 290 may be provided between the auxiliary spring 280 and the leaf member 240 to define a minimum distance therebetween at an apex of the auxiliary spring 280 and at the longitudinal center 246 of the leaf member 240, which is where the coupling between the auxiliary spring 280 and the leaf member 240 is generally provided. In this regard, a thickness of the positioner 290 may be selected to define the distance between the auxiliary spring 280 and the leaf member 240. A width of the positioner 290 may be selected to be similar to a width of the leaf member 240 (which may have a similar and in some cases identical width to that of the auxiliary spring 280). A length of the positioner 290 may be selected to extend along an interface portion between the auxiliary spring 280 and the leaf member 240. In some cases, one or more threaded fasteners 292 or other fastening members (e.g., one or more pins with an interference or press fit) may be employed to pass through the leaf member 240 at or near the longitudinal center 246 and also pass through both the positioner 290 and the auxiliary spring 280 at the apex of the auxiliary spring 280 to hold these three components rigidly together. The length of the positioner 290 may therefore also be selected to ensure that the threaded fasteners 292 and the one or more U-shaped bolts 272 all fit within a span of the length of the positioner 290. Notably, in some cases, the positioner 290 may not be a separate component and may be integrated into either or both of the auxiliary spring 280 or the leaf member 240.

Figure 4:
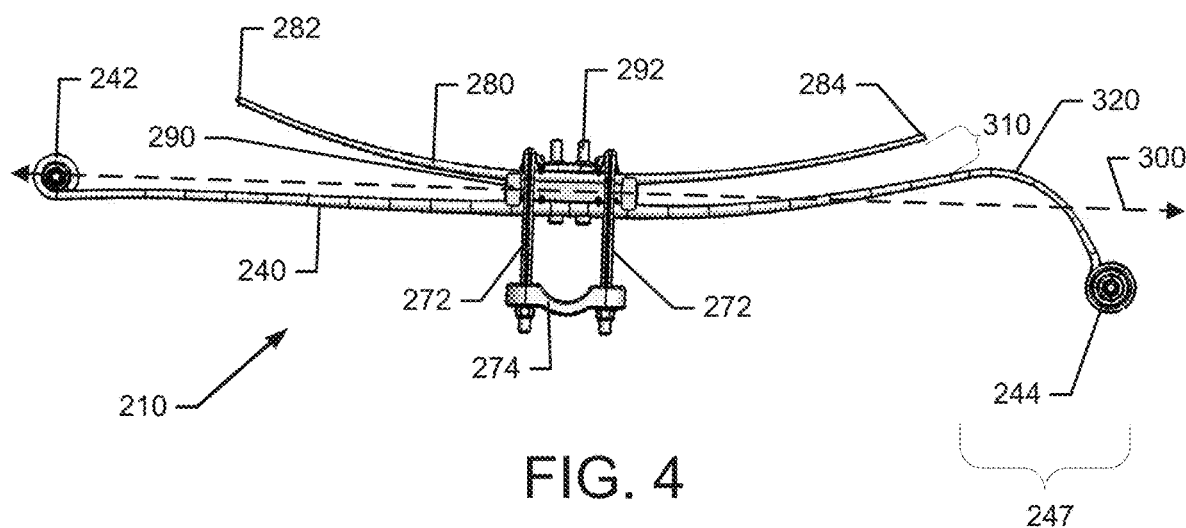
FIG. 4 illustrates a side view of the tension leaf assembly in accordance with an example embodiment.
Figure 5:
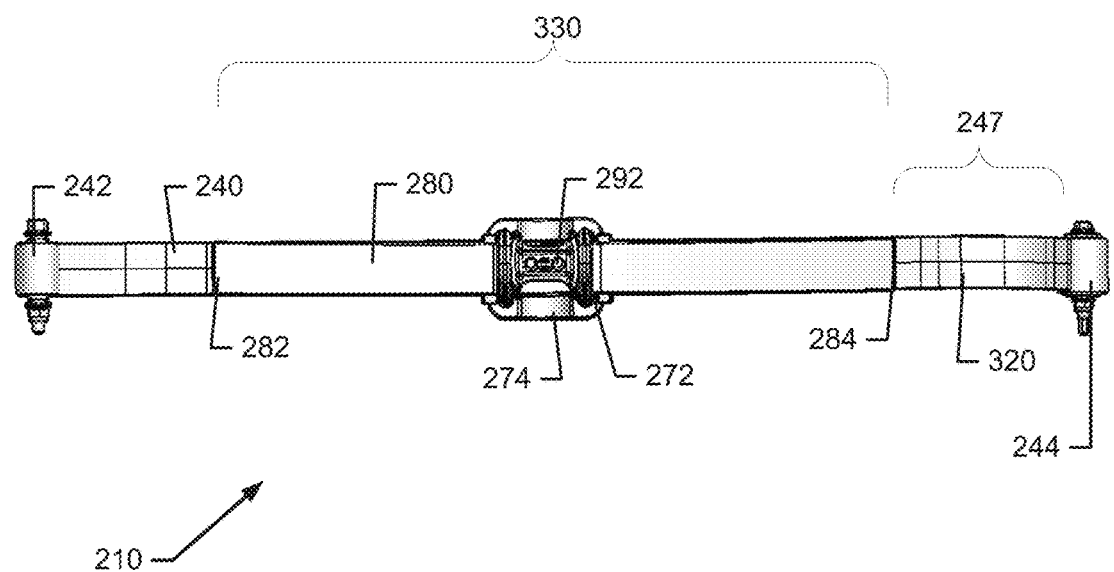
FIG. 5 illustrates a top view of the tension leaf assembly in accordance with an example embodiment and FIG. 6 illustrates a rear view of the tension leaf assembly in accordance with an example embodiment.
Figure 6:
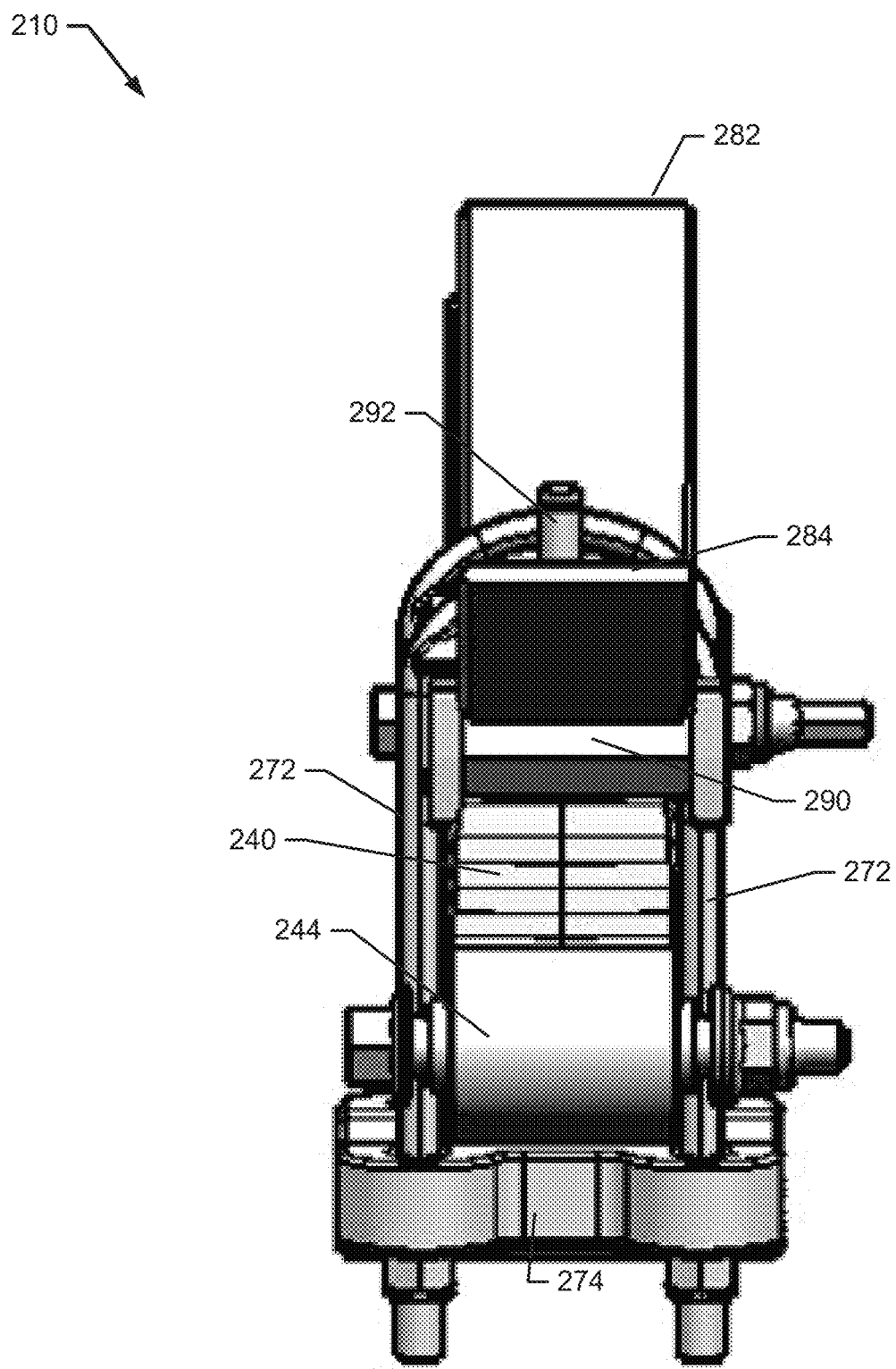

Referring to FIG. 4, it can be appreciated that the positioner may lie in a reference plane 300. In the loaded rest state shown in FIG. 4, the auxiliary spring 280 is and may remain entirely on one side (e.g., a first side) of the reference plane 300. In this regard, the auxiliary spring 280 includes a first free end 282 disposed at a first longitudinal end of the auxiliary spring 280 and a second free end 284 disposed at a second longitudinal end of the auxiliary spring 280. The first free end 282 may face away from the suspension portion 245 and the second free end 284 may face away from the bend portion 247. Thus, for example when maximum compression is encountered, the first and second free ends 282 and 284 may contact a portion of the chassis 120 and further resist compression. The first and second free ends 282 and 284 should therefore be understood to neither contact the chassis 120 nor any portion of the leaf member 240 during a compression cycle until a heavily loaded condition at which contact is made between the first and second free ends 282 and 284 and the portion of the chassis 120 to add additional compression resistance to the tension leaf assembly 240 a rate of which can be determined based on the thickness and curvature of the auxiliary spring 280. The auxiliary spring 280 therefore provides more rate under higher loads to prevent sag, and also provides more rate when roll forces are encountered for high center of gravity vehicles.

In an example embodiment, the suspension portion 245 may be entirely or mostly on the first side of the reference plane 300 also in the resting loaded state. Meanwhile, the bend portion 247 may be disposed to extend across the reference plane 300. Thus, for example, some portion of the bend portion 247 may be disposed on the first side of the reference plane 300 and another portion of the bend portion 247 may extend to a second side of the reference plane 300 (opposite the first side). In an example embodiment, the positioner 290 may be selected to have a width that further defines a gap 310 between the leaf member 240 and the auxiliary spring 280. The gap 310 may be reduced in size near the first and second free ends 282 and 284, but nevertheless the gap 310 may be maintained to prevent contact between the auxiliary spring 280 and the leaf member 240 during full compression of the tension leaf with auxiliary spring assembly 210. Given that it may be desirable to prevent such contact, an apex 320 of the bend portion 247 may be disposed outside a span 330 of the auxiliary spring 280 to facilitate maintaining the gap 310. The span 330 may be measured between the first free end 282 and the second free end 284. The apex 320 of the bend portion 247 may also be disposed about as far away from the reference plane 300 as the second eye 244 on an opposite side of the reference plane 300 from the second eye 244.

As noted above, the leaf member 240 may include the first eye 242 disposed at the first end 241 to operably couple the first end 241 to a first portion of a chassis 120 of the vehicle. The leaf member 240 may also include the second eye 244 at the second end 243 of the leaf member 240 to operably couple the second end 243 to a second portion of the chassis 120, which may be rearward of the first portion to create the desired increased stiffness at the front end of the vehicle. Although not required, the first end 241 of the leaf member 240 may engage the first eye 242 substantially tangent to a periphery of the first eye 242 as shown best in FIG. 4. Meanwhile, the second end 243 of the leaf member 240 may engage the second eye 244 substantially perpendicular to a periphery of the second eye 244. The radius of the bend portion 247, and the interface between the second eye 244 and the second end 243 further defines the formation of an angle of between about 30 and 60 degrees between the bend portion 247 and the reference plane 300 at a point of intersection therebetween. This angle may be substantially similar to the angle of the bend portion 247 relative to the reference plane 300 at the intersection of the second end 243 with the second eye 244. Meanwhile, the suspension portion 245 may extend toward the first end 241 of the leaf member 240 to engage the first eye 242 forming an angle of between about 0 and 15 degrees with respect to the reference plane 300. In an example embodiment, in a resting loaded state, the first eye 242 may be partly or entirely on the first side of the reference plane 300 and the second eye 244 may be on the second side of the reference plane 300. In any case, the suspension portion 245 may not deviate far away from the reference plane 300 thereby always either staying parallel to the reference plane 300 or otherwise forming only a small angle therewith. Meanwhile, to the contrary, the bend portion 247 may deviate substantially away from the reference plane 300 and pass through the reference plane 300 at a larger angle. These angular relationships may combine to maintain the gap 310 while still providing robust compression resistance to the suspension system.

A tension leaf assembly for a vehicle suspension system may therefore be provided. The tension leaf assembly may include an S-shaped leaf member, an auxiliary spring, and a coupling assembly. The leaf member includes a first end, a second end, and a longitudinal center disposed between the first and second ends. The leaf member may include a suspension portion extending from the first end past the longitudinal center and a bend portion extending from the suspension portion to the second end. The auxiliary spring is operably coupled to the leaf member at or proximate to the longitudinal center and extending longitudinally in a direction substantially parallel to a direction of extension of the leaf member. The auxiliary spring includes a first free end facing away from the suspension portion and a second free end facing away from the bend portion. The coupling assembly operably couples the leaf member to the auxiliary spring at or proximate to the longitudinal center. The coupling assembly includes a positioner disposed between the auxiliary spring and the leaf member and a holding bracket to engage a wheel axle of the vehicle.

The tension leaf assembly (or a suspension system including the same) of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the coupling assembly may include one or more U-shaped bolts, and the one or more U-shaped bolts may engage the auxiliary spring at an apex thereof and engage the holding bracket at distal ends of thereof. In an example embodiment, the positioner may lie in a reference plane, the auxiliary spring may be disposed entirely on a first side of the reference plane, the suspension portion may be on the first side of the reference plane, and the bend portion may be disposed to extend from the first side of the reference plane to a second side of the reference plane. In some cases, the leaf member may include a first eye at the first end to operably couple the first end to a first portion of a chassis of the vehicle, the leaf member may include a second eye at the second end to operably couple the second end to a second portion of the chassis of the vehicle, the first end of the leaf member may engage the first eye substantially tangent to a periphery of the first eye, and the second end of the leaf member may engage the second eye substantially perpendicular to a periphery of the second eye. In an example embodiment, in a resting loaded state, the first eye may be substantially on the first side of or near the reference plane and the second eye is on the second side of the reference plane and farther apart therefrom. In some cases, the suspension portion may extend toward the first end of the leaf member to engage the first eye forming an angle of between about 0 and 15 degrees with respect to the reference plane, and the bend portion may extend toward the second end of the leaf member to engage the second eye forming an angle of between about 20 and 60 degrees with respect to the reference plane. In an example embodiment, an apex of the bend portion may be disposed about as far away from the reference plane as the second eye on an opposite side of the reference plane from the second eye. In some cases, the second eye may be disposed rearward of the first eye with respect to a front end of the vehicle. In an example embodiment, the positioner may have a width defining a gap between the leaf member and the auxiliary spring, and the gap may be maintained during full compression of the tension leaf assembly. In some cases, an apex of the bend portion may be disposed outside a span of the auxiliary spring, the span being measured between the first free end and the second free end.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:
1. A tension leaf assembly for a vehicle suspension system, the tension leaf assembly comprising:
   an S-shaped leaf member having a first end, a second end, and a longitudinal center disposed between the first and second ends, wherein the S-shaped leaf member further comprises a suspension portion extending from the first end past the longitudinal center and a bend portion extending from the suspension portion to the second end;
   an auxiliary spring operably coupled to the S-shaped leaf member and extending longitudinally in a direction substantially parallel to a direction of extension of the S-shaped leaf member, the auxiliary spring having a first free end facing away from the suspension portion and a second free end facing away from the bend portion; and
   a coupling assembly operably coupling the S-shaped leaf member to the auxiliary spring at or proximate to the longitudinal center, the coupling assembly comprising a positioner disposed between the auxiliary spring and the S-shaped leaf member and a holding bracket to engage a wheel axle of the vehicle.
2. The tension leaf assembly of claim 1, wherein the coupling assembly comprises one or more U-shaped bolts, the one or more U-shaped bolts engaging the auxiliary spring at an apex thereof and engaging the holding bracket at distal ends of thereof.

3. The tension leaf assembly of claim 1, wherein the positioner lies in a reference plane,
wherein the auxiliary spring is disposed entirely on a first side of the reference plane,
wherein the suspension portion is on the first side of the reference plane, and
wherein the bend portion is disposed to extend from the first side of the reference plane to a second side of the reference plane.

4. The tension leaf assembly of claim 3, wherein the S-shaped leaf member comprises a first eye at the first end to operably couple the first end to a first portion of a chassis of the vehicle,
wherein the S-shaped leaf member comprises a second eye at the second end to operably couple the second end to a second portion of the chassis of the vehicle,
wherein the first end of the S-shaped leaf member engages the first eye substantially tangent to a periphery of the first eye, and
wherein the second end of the S-shaped leaf member engages the second eye substantially perpendicular to a periphery of the second eye.

5. The tension leaf assembly of claim 4, wherein, in a resting loaded state, the first eye is substantially on the first side of or near the reference plane and the second eye is on the second side of the reference plane and spaced apart from the reference plane.

6. The tension leaf assembly of claim 5, wherein the suspension portion extends toward the first end of the S-shaped leaf member to engage the first eye forming an angle of between about 0 and 15 degrees with respect to the reference plane, and
wherein the bend portion extends toward the second end of the S-shaped leaf member to engage the second eye forming an angle of between about 20 and 60 degrees with respect to the reference plane.

7. The tension leaf assembly of claim 4, wherein an apex of the bend portion is disposed spaced apart from the reference plane on an opposite side of the reference plane from the second eye.

8. The tension leaf assembly of claim 7, wherein the second eye is disposed rearward of the first eye with respect to a front end of the vehicle.

9. The tension leaf assembly of claim 1, wherein the positioner has a width defining a gap between the S-shaped leaf member and the auxiliary spring, and
wherein the gap is maintained during full compression of the tension leaf assembly.

10. The tension leaf assembly of claim 1, wherein an apex of the bend portion is disposed outside a span of the auxiliary spring, the span being measured between the first free end and the second free end.

11. A vehicle suspension system, the vehicle suspension system comprising:
a wheel assembly of a vehicle;
a chassis of the vehicle; and
a tension leaf assembly operably coupling the wheel assembly and the chassis to dampen forces on the body of the vehicle responsive to compression and rebound events experienced at the wheel assembly,
wherein the tension leaf assembly comprises:
an S-shaped leaf member having a first end, a second end, and a longitudinal center disposed between the first and second ends, wherein the S-shaped leaf member further comprises a suspension portion extending from the first end past the longitudinal center and a bend portion extending from the suspension portion to the second end;
an auxiliary spring operably coupled to the S-shaped leaf member and extending longitudinally in a direction substantially parallel to a direction of extension of the S-shaped leaf member, the auxiliary spring having a first free end facing away from the suspension portion and a second free end facing away from the bend portion; and
a coupling assembly operably coupling the S-shaped leaf member to the auxiliary spring at or proximate to the longitudinal center, the coupling assembly comprising a positioner disposed between the auxiliary spring and the S-shaped leaf member and a holding bracket to engage a wheel axle of the vehicle.

12. The vehicle suspension system of claim 11, wherein the coupling assembly comprises one or more U-shaped bolts, the one or more U-shaped bolts engaging the auxiliary spring at an apex thereof and engaging the holding bracket at distal ends of thereof.

13. The vehicle suspension system of claim 11, wherein the positioner lies in a reference plane,
wherein the auxiliary spring is disposed entirely on a first side of the reference plane,
wherein the suspension portion is on the first side of the reference plane, and
wherein the bend portion is disposed to extend from the first side of the reference plane to a second side of the reference plane.

14. The vehicle suspension system of claim 13, wherein the S-shaped leaf member comprises a first eye at the first end to operably couple the first end to a first portion of a chassis of the vehicle,
wherein the S-shaped leaf member comprises a second eye at the second end to operably couple the second end to a second portion of the chassis of the vehicle,
wherein the first end of the S-shaped leaf member engages the first eye substantially tangent to a periphery of the first eye, and
wherein the second end of the S-shaped leaf member engages the second eye substantially perpendicular to a periphery of the second eye.

15. The vehicle suspension system of claim 14, wherein, in a resting loaded state, the first eye is substantially on the first side of the reference plane and the second eye is on the second side of the reference plane.

16. The vehicle suspension system of claim 15, wherein the suspension portion extends toward the first end of the S-shaped leaf member to engage the first eye forming an angle of between about 0 and 15 degrees with respect to the reference plane, and
wherein the bend portion extends toward the second end of the S-shaped leaf member to engage the second eye forming an angle of between about 30 and 60 degrees with respect to the reference plane.

17. The vehicle suspension system of claim 14, wherein an apex of the bend portion is disposed about as far away from the reference plane as the second eye on an opposite side of the reference plane from the second eye.

18. The vehicle suspension system of claim 17, wherein the second eye is disposed rearward of the first eye with respect to a front end of the vehicle.

19. The vehicle suspension system of claim 11, wherein the positioner has a width defining a gap between the S-shaped leaf member and the auxiliary spring, and wherein the gap is maintained during full compression of the tension leaf assembly.

20. The vehicle suspension system of claim 11, wherein an apex of the bend portion is disposed outside a span of the auxiliary spring, the span being measured between the first free end and the second free end.

\* \* \* \* \*